No. 667,377. Patented Feb. 5, 1901.
A. G. WATERHOUSE.
APPARATUS FOR RAISING AND HEATING WATER.
(Application filed Dec. 19, 1899.)
(No Model.)
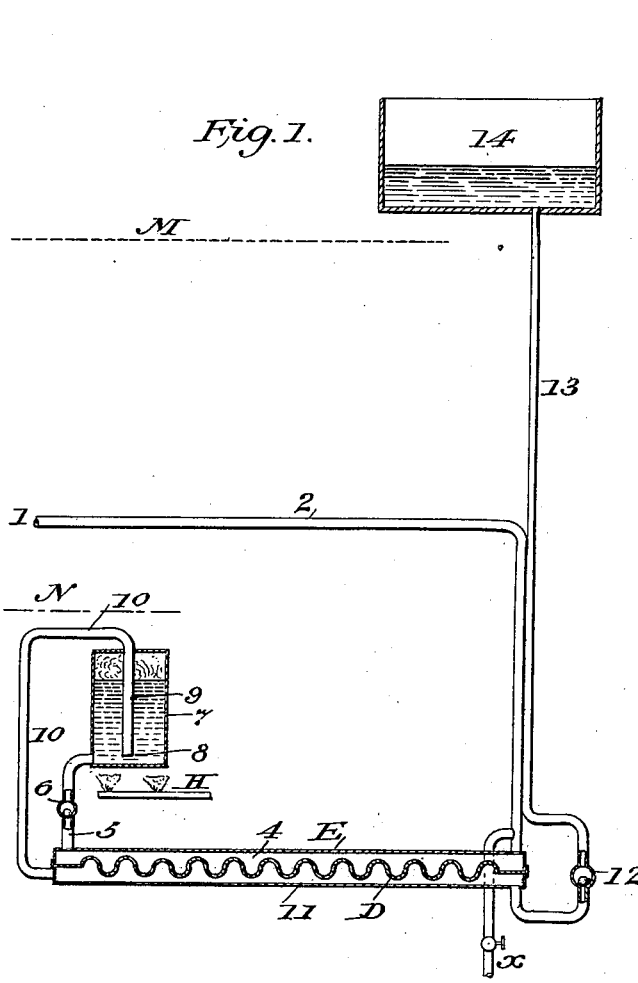
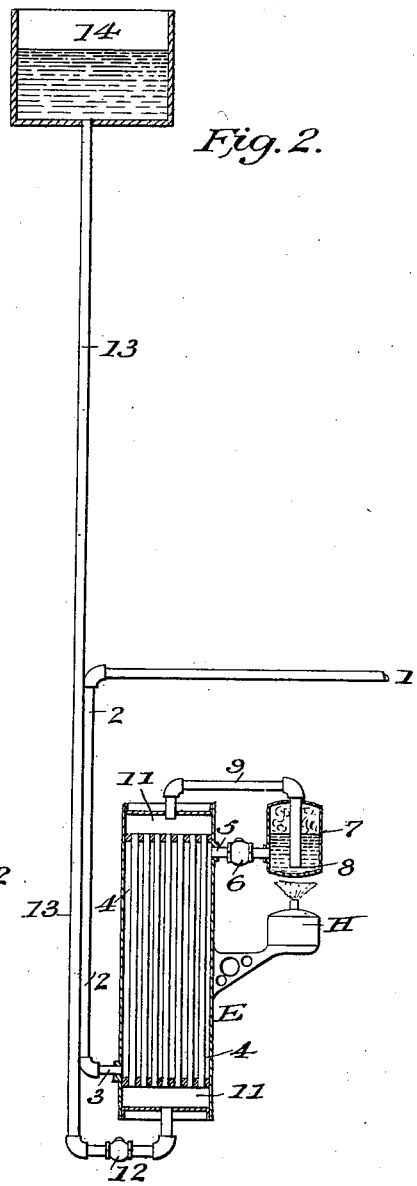
Witnesses:
Geo. L. G. Waterhouse.
W. S. Watson.
Inventor:
Addison G. Waterhouse

UNITED STATES PATENT OFFICE.

ADDISON G. WATERHOUSE, OF SPRINGFIELD, PENNSYLVANIA.

APPARATUS FOR RAISING AND HEATING WATER.

SPECIFICATION forming part of Letters Patent No. 667,377, dated February 5, 1901.

Application filed December 19, 1899. Serial No. 740,931. (No model.)

*To all whom it may concern:*

Be it known that I, ADDISON G. WATERHOUSE, a citizen of the United States, residing in the township of Springfield, county of Delaware and State of Pennsylvania, have invented new and useful Improvements in an Apparatus for Heating and Raising Water, of which the following is a specification.

My invention relates to that class of steam water-elevators by which water is elevated by being directly displaced by steam under pressure.

The object of my invention is to produce a steam water-elevator which will be efficient in action and economical in operation.

My invention consists of means for conserving the heat employed in operating a steam water-elevator, so that the heat applied for operating it will be transferred from the water after heat has been applied to it, and before it is discharged from the apparatus, to the inflowing water while on its way to that part of the apparatus where heat is applied to it, so that the same heat can be used over and over again.

I am aware that steam water-elevators have been made and used in which steam has been employed for exerting a pressure upon the surface of the water, which would cause the steam to directly displace the water and force it to a higher level and by the condensation of the same steam cause the apparatus to refill with the water, so that its operation would be automatic and continuous. Heretofore this class of steam water-elevators have not been efficient in action or economical to operate, for the reason that the heat employed for operating them has been carried off by the cold water operated upon, and this loss of heat has been very great, owing to the fact that steam is employed for exerting a pressure upon and directly displacing the water to be elevated, and the case is the same whether this steam is produced from the water to be elevated by first heating such water or by first producing the steam by other means and then bringing it in contact with cold water to be elevated, which would result in condensing a large part of the steam so employed before it could exert a pressure upon and displace the water, so that in either case a great amount of heat would be carried off by the water elevated and lost. This objection is overcome by my invention by employing means through which the heat imparted to the water is extracted from it and returned to that part of the apparatus where heat is applied, so that the same heat is used over and over again, and therefore the water is discharged from the apparatus at about the same temperature that it had when drawn from the source of supply, so that the heat is not carried off or wasted, and the result is that a high degree of efficiency and economy is obtained.

In order to more fully describe my invention, reference will be had to the accompanying drawings, in which—

Figure 1 shows diagrammatically an apparatus embodying my invention. Fig. 2 shows, partly in section, a practical form of apparatus.

Fig. 1 shows the different parts required for the practical carrying out of my invention. E is a heat-exchange, essentially composed of two separate water-tight contiguous compartments, through which water can pass in opposite directions. These two compartments, 4 and 11, are separated by the partition D, composed of metal or material adapted for conducting heat, so that when water in one of these compartments has a higher temperature than water in the other compartment the heat will be conducted through the partition D from the water having the higher to the water having the lower temperature.

7 is a pumping-chamber to which heat is applied, as represented by H. This chamber 7 is a closed vessel formed so that heat can be applied to it. Water is supplied to it through pipe 5 and check-valve 6. The water is forced from it through pipe 9, which starts at 8 or a point near the bottom of chamber 7. This pumping-chamber 7 furnishes the means through which heat (represented by H) can raise the temperature of water in chamber 7 until steam is generated from it, so that the pressure of this steam will force the water out of the chamber by way of pipe 9 to any desired level or pressure. 7 also furnishes the means for refilling itself as often as the water in it is expelled by the steam. This is done by the steam following the water out through pipes 9 and 10 and into the heat-exchange E until it meets a greater condensing-surface, which lowers its pressure. Then, owing to the level of the source of supply 1 and pipe 2, the supply-water is forced through pipe 5 and check-valve 6 into the chamber 7. This condenses the steam in 7 and forms a partial vacuum, which draws more water in through pipes 2 and 3 and compartment 4 of the heat-exchange E, then up through pipe 5 and check-valve 6, and completely fills chamber 7, so that the action of this apparatus will be automatic.

In operation the water, starting from its source of supply 1, passes through pipes 2 and 3, then through compartment 4 of the heat-exchange E. While in 4 it absorbs the heat from the hot water in compartment 11, which has been forced from the pumping-chamber 7, so that by the time a given amount of water has passed through 4 it will be raised to about the same temperature as the water in compartment 11 when first forced from the chamber 7, so that when this heated water is drawn from compartment 4 into chamber 7 it has reached a temperature which requires that very little additional heat be applied to it while in 7 in order to generate sufficient steam from it to expel it, and as the hot water is forced from 7 into compartment 11 it gradually moves along through this compartment at every action of the pumping-chamber and gives up its heat to the cooler water moving in an opposite direction through 4, so that by the time it has passed through compartment 11 it has been lowered to about the same temperature it had when drawn from the source of supply 1, and in this condition it is forced through check-valve 12, which prevents its return, and then up pipe 13 to the receiving-tank 14. Therefore the heat is not carried off by the water elevated, but is retained within the apparatus and used over and over again.

Fig. 2 shows, partly in section, a practical form of apparatus, with all the parts shown in Fig. 1 indicated by like signs. In this form of apparatus the heat-exchange E consists of an upright cylindrical shell having at each end a closed chamber, which communicate together through a number of heat-transferring tubes. These two chambers, together with the interior of the tubes, form one of the separate compartments of this heat-exchange, while the other compartment is formed by the space surrounding the tubes and within the outer shell.

What I claim as my invention is—

1. In an apparatus for heating and raising water, in combination, a heat-exchange having two contiguous compartments, and a heating-chamber, adapted for having heat applied to it; with a passage provided with a check-valve leading from a source of supply above the level of the apparatus, and through one of the compartments of the heat-exchange to the heating-chamber; and a passage provided with a check-valve leading from the heating-chamber, through the other compartment of the heat-exchange to a point of discharge located above the level of the source of supply; substantially as and for the purposes set forth.

2. In an apparatus for heating and raising water, the combination of a heat-exchange, having two contiguous compartments; and a heating-chamber, with a passage provided with a check-valve, leading from a source of supply, above the level of the apparatus, and through one of the compartments of the heat-exchange, to the heating-chamber: and a passage provided with a check-valve, leading from the heating-chamber, through the other compartment of the heat-exchange, to a discharge located at a level above the source of supply; with means for applying heat whereby steam is produced under pressure, for displacing the water within the heating-chamber, and forcing it out through the discharge; and causing the condensation of the steam, by the inflow of water due to the elevation of its source of supply; substantially as and for the purposes set forth.

ADDISON G. WATERHOUSE.

Witnesses:
GEO. L. WATERHOUSE,
RICHARD YOUNG.